Patented Nov. 6, 1945

2,388,302

UNITED STATES PATENT OFFICE 2,388,302

REMOVAL OF IRON FROM CERAMIC RAW MATERIALS

Woldemar A. Weyl, State College, Pa., assignor to American Optical Company, Southbridge, Mass., a voluntary association of Massachusetts No Drawing. Application March 12, 1943, Serial No. 478,959

3 Claims. (Cl. 23—110)

This invention relates to ceramic raw materials and has particular reference to novel means and method of removing iron from such materials.

This application is a continuation in part of my copending application Serial No. 471,293, filed January 4, 1943.

One of the principal objects of the invention is to provide novel means and method of removing iron from iron containing ceramic raw materials.

Another object of the invention is to provide novel means and method of obtaining iron-free ceramic raw materials adapted particularly for use in forming high quality optical glasses.

Another object is to provide novel means and method of obtaining iron-free ceramic raw materials adapted particularly for use in forming white ware bodies adapted particularly for use in forming high grade electric insulators, chinaware and the like.

Other objects and advantages of the invention will become apparent from the following description and it will be apparent that many changes may be made in the means and methods set forth without departing from the spirit of the invention as expressed in the accompanying claims. I, therefore, do not wish to be limited to the exact means and methods set forth herein as the preferred means and methods have been given only by way of illustration.

Raw ceramic materials, in most all instances, contain iron as a foreign matter which is detrimental to forming high grade glasses or white ware bodies such as high grade china, electric porcelains and the like.

It has been found that in some instances the iron can be removed from the raw ceramic material by magnetic separation, particularly, in instances when the iron is in the form of separate grains or crystals of magnetic minerals permitting them to be separated from the raw ceramic material through the use of a magnetic force. In other instances, however, it has been found that the iron may be in the form of a coating on the crystals in which instance it can not be removed by the use of a magnetic force but must depend upon a chemical treatment of dilute acids which are of such character as to dissolve the iron from the surface of the crystals. In other instances, however, it has been found that the iron is present as a chemical entity within the body of the crystal in which instance the magnetic and acid treatment are not effective.

The present invention is directed particularly to the removal of the iron; in the latter instance, it being understood of course that the method to be disclosed hereinafter could be used in any instance. In said latter instance, the iron is present as isomorphous iron and the present invention is directed particularly to the removal of such iron.

The particular means and method of removing iron from the crystals, when the iron is present as a chemical part of the crystal and is embedded in the body thereof, is substantially as follows:

The raw material, in subdivided form, is exposed to the vapors of carbon disulphide in a temperature ranging between 250° C. and 600° C. Under these conditions ferrous sulphide is formed which can be subsequently easily dissolved by a treatment with dilute acid, such as dilute hydrochloric or sulphuric acid. This treatment being in the form of a washing operation by placing the material having its iron changed to soluble ferrous salts in a bath of the dilute acids. The ceramic crystals are then removed and will be free from the iron content. Suitable filtering and drying process may be thereafter employed.

The resultant iron free ceramic material may thereafter be used in forming high grade optical glasses with the said resultant glasses being free from color, which might be introduced by the presence of iron, and having a high transmission in the extra visual region of the spectrum, particularly in the ultra-violet range down to very short wave lengths.

The resulting ceramic material is also particularly adaptable for use in forming white ware bodies such as high grade china, insulating porcelains and the like. In the case of the high grade china the body thereof is of a whiter nature than is possible to obtain with ceramics containing iron. In the case of insulating porcelain the said insulating porcelain will have a more permanent homogeneous structure during the extent of its use.

Although carbon disulphide is set forth above as the preferred compound for the initial treatment for the raw ceramic material, it is to be understood that a compound selected from a group of volatile sulphides such as carbon disulphide, and mercaptans or other similar gaseous or volatile organic sulphides may be used.

From the foregoing description it will be seen that simple, efficient and economical means and methods have been provided for accomplishing all of the objects and advantages of the invention.

Having described my invention, I claim:

1. The method of removing isomorphous iron from ceramic raw materials comprising exposing the material in subdivided form to the vapors of carbon disulphide in a temperature ranging between 250° C. and 600° C. to change the iron to ferrous sulphide and subsequently dissolving the ferrous sulphide by further treatment of the material with a member of the group consisting of dilute hydrochloric and sulphuric acids.

2. The method of removing isomorphous iron from ceramic raw materials comprising subjecting said materials to a vapor of carbon disulphide and thereafter subjecting said material to a dilute acid.

3. The method of removing isomorphous iron from ceramic raw materials comprising subjecting said materials to a vapor of carbon disulphide and thereafter subjecting said material to a dilute acid selected from a group consisting of hydrochloric and sulphuric acid.

WOLDEMAR A. WEYL.